United States Patent
Melman et al.

(10) Patent No.: US 8,255,515 B1
(45) Date of Patent: Aug. 28, 2012

(54) RATE LIMITING PER-FLOW OF TRAFFIC TO CPU ON NETWORK SWITCHING AND ROUTING DEVICES

(75) Inventors: David Melman, D.N. Bikat Beit Hakerem (IL); Tsahi Daniel, Tel-Aviv (IL); Eran Regev, Haifa (IL)

(73) Assignee: Marvell Israel (M.I.S.L.) Ltd. (IL)

( * ) Notice: Subject to any disclaimer, the term of this patent is extended or adjusted under 35 U.S.C. 154(b) by 869 days.

(21) Appl. No.: 11/334,184

(22) Filed: Jan. 17, 2006

(51) Int. Cl.
*G06F 15/173* (2006.01)
*G08B 23/00* (2006.01)

(52) U.S. Cl. ........ 709/224; 709/223; 709/225; 709/226; 709/232; 709/233; 726/22; 726/23; 370/235

(58) Field of Classification Search .......... 709/238–244, 709/223–226, 232, 233; 370/235
See application file for complete search history.

(56) References Cited

U.S. PATENT DOCUMENTS

| | | | |
|---|---|---|---|
| 5,550,816 A | 8/1996 | Hardwick et al. | |
| 6,356,951 B1 | 3/2002 | Gentry, Jr. | |
| 6,473,400 B1 * | 10/2002 | Manning | 370/229 |
| 6,502,135 B1 * | 12/2002 | Munger et al. | 709/225 |
| 7,106,752 B2 | 9/2006 | Yamada | |
| 7,298,707 B2 | 11/2007 | Retana et al. | |
| 7,310,309 B1 * | 12/2007 | Xu | 370/230.1 |
| 7,362,702 B2 | 4/2008 | Terrell et al. | |
| 7,385,924 B1 * | 6/2008 | Riddle | 370/235 |
| 7,415,034 B2 | 8/2008 | Muller et al. | |
| 7,460,534 B1 * | 12/2008 | Bellenger | 370/392 |
| 7,490,151 B2 * | 2/2009 | Munger et al. | 709/225 |
| 7,636,356 B1 | 12/2009 | Melman et al. | |
| 7,787,442 B2 * | 8/2010 | Akahane et al. | 370/352 |
| 7,797,738 B1 * | 9/2010 | Spatscheck et al. | 726/13 |
| 7,899,048 B1 * | 3/2011 | Walker et al. | 370/390 |
| 7,917,647 B2 * | 3/2011 | Cooper et al. | 709/233 |
| 2005/0018682 A1 * | 1/2005 | Ferguson et al. | 370/392 |
| 2005/0157647 A1 * | 7/2005 | Sterne et al. | 370/235 |
| 2005/0160180 A1 * | 7/2005 | Rabje et al. | 709/238 |
| 2005/0276230 A1 * | 12/2005 | Akahane et al. | 370/252 |
| 2006/0036720 A1 * | 2/2006 | Faulk | 709/223 |
| 2006/0272018 A1 * | 11/2006 | Fouant | 726/23 |
| 2007/0058556 A1 | 3/2007 | Hilla et al. | |

OTHER PUBLICATIONS

Office Action issued in U.S. Appl. No. 12/644,428 dated Oct. 29, 2010 (19 pgs).
Office Action issued in U.S. Appl. No. 11/324,597 dated Feb. 11, 2009 (13 pgs).
Office Action issued in U.S. Appl. No. 11/324,597 dated Sep. 30, 2008 (11 pgs).

* cited by examiner

*Primary Examiner* — Haresh N Patel
*Assistant Examiner* — Linglan Edwards

(57) ABSTRACT

A network device for use in a networking system. The network device includes a packet processor adapted to receive control packets at a network port of the network device. The packet processor is also adapted to assign a CPU code to the control packets. The network device also includes a CPU in communication with the packet processor and a lookup table indexed by the CPU code and in communication with the packet processor. According to embodiments of the present invention, one or more entries in the lookup table define a rate limit in accordance with which packets characterized by the CPU code are delivered from the packet processor to the CPU.

39 Claims, 3 Drawing Sheets

RATE LIMITING PER-FLOW OF TRAFFIC TO CPU ON NETWORK SWITCHING AND ROUTING DEVICES

BACKGROUND OF THE INVENTION

The present invention relates generally to methods of managing network traffic. More particularly, the invention provides methods and systems for rate limiting the flow of control traffic to a CPU. Merely by way of example, the invention has been applied to a rate limiter with a configurable time window, a counter, and a configurable threshold value. But it would be recognized that the invention has a much broader range of applicability.

In communications networks, both data and control packets are processed through the network. At various network devices, control packets, which are related to various control protocols, are received and directed to the CPU resident in the network device. Preferably, control traffic received at the network ports of a network device is identified and directed to the CPU for processing. As an example, control traffic can be trapped or mirrored to the CPU. Trapping of packets involves sending control packets only to the CPU. Mirroring to the CPU involves forwarding control packets to a network egress port, but also sending a copy of the control packets to the CPU.

As the volume of network traffic increases, the number of control packets sent to the CPU increases as well. Thus, there is a need in the art for improved methods and systems for rate limiting control traffic to the CPU for network switching and routing devices.

SUMMARY OF THE INVENTION

According to the present invention, methods of managing network traffic are provided. More particularly, the invention provides methods and systems for rate limiting the flow of control traffic to a CPU. Merely by way of example, the invention has been applied to a rate limiter with a configurable time window, a counter, and a configurable threshold value. But it would be recognized that the invention has a much broader range of applicability.

According to an embodiment of the present invention, a network device for use in a networking system is provided. The network device includes a packet processor adapted to receive control packets at a network port of the network device. The packet processor is also adapted to assign a CPU code to the control packets. Each type of control packet is assigned a unique CPU code. For example, each of the following types of control packet are assigned a unique CPU code: BPDU, LACP, GVRP, RIPv1, RIPv2, OSPFv2, PIM, TELNET, HTTP, and the like. The network device also includes a CPU in communication with the packet processor. The network device further includes a memory storing a lookup table indexed by the CPU code and in communication with the packet processor. One or more entries in the lookup table define a rate limit in accordance with which packets characterized by the CPU code are delivered from the packet processor to the CPU. In a particular embodiment, the rate limit is determined utilizing a configurable time window, a counter, and a configurable threshold value.

According to another embodiment of the present invention, a method of operating a network device for use in a networking system is provided. The method includes receiving control packets at a network port of the network device and assigning a CPU code to the control packets using a packet processor. The method also includes providing a CPU in communication with the packet processor. The method further includes providing a memory storing a lookup table indexed by the CPU code and in communication with the packet processor. One or more entries in the lookup table define a rate limit in accordance with which packets characterized by the CPU code are delivered from the packet processor to the CPU.

According to yet another embodiment of the present invention, a method of managing control packets in a communications network is provided. The method includes receiving one or more control packets at a network device including a CPU. The method also includes providing a CPU code table indexed by a plurality of CPU codes. One or more entries of the CPU code table include a rate limiting attribute defining a rate at which the one or more control packets are delivered to the CPU. The method further includes routing the one or more control packets to the CPU in accordance with the rate limiting attribute.

According to an alternative embodiment of the present invention, a network device adapted to manage control packets in a communications network is provided. The network device includes an ingress pipeline adapted to receive one or more control packets at the network device. The network device also includes a CPU. The network device also includes a memory storing a CPU code table indexed by a plurality of CPU codes. In an embodiment, one or more entries of the CPU code table include a rate limiting attribute defining a rate at which the one or more control packets are delivered to the CPU. The network device further includes a packet processor adapted to route the one or more control packets to the CPU in accordance with the rate limiting attribute.

According to another alternative embodiment of the present invention, a method of rate limiting packet delivery to a CPU in a network device is provided. The method includes receiving a control packet at a port of the network device and comparing a value stored in a counter to a threshold value stored in a memory. The method also includes delivering the control packet to the CPU and incrementing the value stored in the counter if the value stored in the counter is less than the threshold value. The method further includes dropping the control packet if the value stored in the counter is greater than or equal to the threshold value and resetting the value stored in the counter to a baseline value after a predetermined time has passed. If the packet is dropped, the interrupt corresponding to the rate limiter is raised to indicate to the CPU that the given rate limiter has exceeded its threshold.

According to yet another alternative embodiment of the present invention, an apparatus adapted to rate limit packet delivery to a CPU in a network device is provided. The apparatus includes a port of the network device adapted to receive a control packet. The apparatus also includes a processor adapted to compare a value stored in a counter to a threshold value stored in a memory and deliver the control packet to the CPU and increment the value stored in the counter if the value stored in the counter is less than the threshold value. The processor is also adapted to drop the control packet if the value stored in the counter is greater than or equal to the threshold value and reset the value stored in the counter to a baseline value after a predetermined time has passed.

According to a particular embodiment of the present invention, a network device for use in a networking system is provided. The network device includes means for receiving control packets at a network port of the network device. The network device also includes means for assigning a CPU code to the control packets. The network device includes a CPU in communication with the packet processor. The network device further includes means for storing a lookup table indexed by the CPU code and in communication with to the packet processor. One or more entries in the lookup table define a rate limit in accordance with which packets characterized by the CPU code are delivered from the packet processor to the CPU. In a particular embodiment, the rate limit is determined utilizing a configurable time window, a counter, and a configurable threshold value.

Another particular embodiment of the present invention may be implemented in code, for example, by a digital signal processor (DSP). One such embodiment includes code for receiving control packets at a network port of the network device and code for assigning a CPU code to the control packets using a packet processor. The embodiment also includes code for providing a CPU in communication with the packet processor. The embodiment further includes code for providing a memory storing a lookup table indexed by the CPU code and in communication with the packet processor. One or more entries in the lookup table define a rate limit in accordance with which packets characterized by the CPU code are delivered from the packet processor to the CPU.

According to yet another particular embodiment of the present invention, an apparatus adapted to manage control packets in a communications network is provided. The apparatus includes means for receiving one or more control packets at a network device including a CPU. The apparatus also includes means for providing a CPU code table indexed by a plurality of CPU codes. One or more entries of the CPU code table include a rate limiting attribute defining a rate at which the one or more control packets are delivered to the CPU. The apparatus further includes means for routing the one or more control packets to the CPU in accordance with the rate limiting attribute.

Still other embodiments of the present invention may be implemented in code, for example, by a DSP. One such embodiment includes code for receiving one or more control packets at a network device including a CPU. The embodiment also includes code for providing a CPU code table indexed by a plurality of CPU codes. One or more entries of the CPU code table include a rate limiting attribute defining a rate at which the one or more control packets are delivered to the CPU. The embodiment further includes code for routing the one or more control packets to the CPU in accordance with the rate limiting attribute.

Another embodiment of the present invention provides a network device adapted to rate limit packet delivery to a CPU in a network device. The network device includes means for receiving a control packet at a port of the network device and means for comparing a value stored in a counter to a threshold value stored in a memory. The network device also includes means for delivering the control packet to the CPU and incrementing the value stored in the counter if the value stored in the counter is less than the threshold value. The network device further includes means for dropping the control packet if the value stored in the counter is greater than or equal to the threshold value and resetting the value stored in the counter to a baseline value after a predetermined time has passed.

Another embodiment of the present invention implemented in code includes a method of rate limiting packet delivery to a CPU in a network device is provided. The method includes code for receiving a control packet at a port of the network device and code for comparing a value stored in a counter to a threshold value stored in a memory. The method also includes code for delivering the control packet to the CPU and incrementing the value stored in the counter if the value stored in the counter is less than the threshold value. The method further includes code for dropping the control packet if the value stored in the counter is greater than or equal to the threshold value and resetting the value stored in the counter to a baseline value after a predetermined time has passed.

Many benefits are achieved by way of the present invention over conventional techniques. For example, embodiments of the present invention provide for rate limiting of control traffic to the CPU, preventing one type of control traffic from dominating the CPU. Moreover, embodiments of the present invention maintain each type of control traffic within the rate configured for that particular type of control traffic. Additionally, the methods and systems provided herein place limits on each type of CPU code, thereby preventing denial service attacks on the network device. Depending upon the embodiment, one or more of these benefits, as well as other benefits, may be achieved. These and other benefits will be described in more detail throughout the present specification and more particularly below in conjunction with the following drawings.

DETAILED DESCRIPTION OF SPECIFIC EMBODIMENTS

Figure 1:
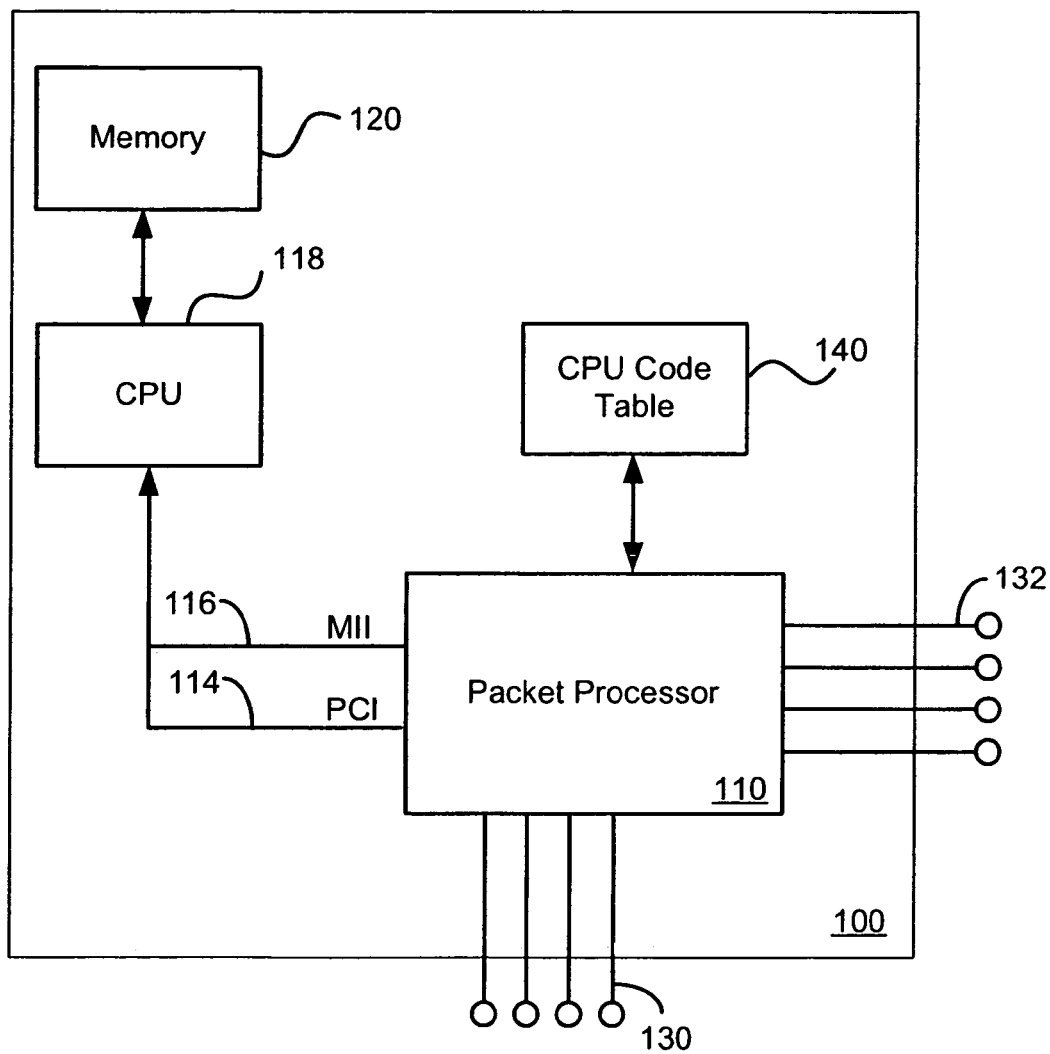
FIG. 1 is a simplified schematic illustration of a network device according to an embodiment of the present invention.

FIG. 1 is a simplified illustration of a network device according to an embodiment of the present invention. As illustrated in FIG. 1, the network device 100, which may be a network switching or routing device, includes a packet processor 110. The packet processor includes one or more CPU interfaces, such as a PCI interface 114 or an MII interface 116 coupled to a CPU 118. The CPU 118 receives information from the packet processor and is responsible for configuring and managing the packet processor. The network device 100 also includes memory 120. The packet processor 110 is connected to a number of ingress network ports 130 and egress network ports 132, for example, 1 Gb Ethernet (GE) ports, 10 Gb Ethernet (XG), and/or MAC ports. As will be evident to one of skill in the art, the simplified illustration provided in FIG. 1 omits various elements for purposes of clarity. Accordingly, embodiments of the present invention are not limited to the illustrations shown in FIG. 1 but include elements that are added, removed, combined, or separated.

According to embodiments of the present invention, various mechanisms are provided within the network device or packet processor for controlling the flow of control traffic to the CPU. As described above, a control packet can be trapped or mirrored. When a control packet is received at the packet processor 110, a CPU code is assigned to the control packet by the packet processor. As an example, the CPU code could be an 8-bit value, providing 256 different codes. A CPU code table 140 is in communication with the packet processor and is indexed by the CPU codes. Additional details regarding the CPU code table are provided throughout the present specification. The CPU codes indicate, among other parameters, the mechanism that triggered the delivery of the packet to the CPU. As described more fully below, the CPU code is also used to determine the attributes that control how the packet is sent to the CPU. Although not illustrated in FIG. 1, the CPU includes a number of queues on which traffic is delivered and/or waits during periods of congestion. Embodiments of the present invention provide methods and systems to manage the rate at which control traffic is delivered to the CPU.

The CPU code table 140 includes a predetermined number of entries indexed by CPU code. In a particular embodiment, the number of entries in the CPU code table is 256 entries. In other embodiments, the number of entries varies as appropriate to the particular applications. The CPU code table described herein is not intended to limit the present invention, but merely provides an example of a specific embodiment. For instance, each entry in the CPU code table includes a number of attributes. These attributes include, but are not limited to:

CPU Code Rate Limiter,
Packet Device Destination to the CPU Port,
Packet QoS on the CPU Port,
Packet Statistical Sampling to CPU Port, and
Packet Truncation on the CPU Port.

These attributes will be described in additional detail below, particularly the CPU code rate limiter, which is described more fully throughout the present specification.

One of the attributes in the CPU code table is an entry for a CPU destination device, indicating a particular CPU (target device) to which a packet should be sent. In a single device system, packets are sent to the CPU via the device host interface. In a cascaded system, however, it may be desirable for the packets to be sent to another CPU attached to another packet processor. For example, a CPU attached to one of several devices in a system may serve as a master CPU for the system.

The value in the CPU destination device entry serves as an index to a CPU Destination Device table. Using this value, CPU traffic is sent to the device with the corresponding number as defined in the CPU Destination Device table. In some embodiments, a value of zero is used to indicate that the packet is sent to the local device CPU port. Other values are associated with a predetermined number of CPUs, indicating the CPU to which traffic is directed. Accordingly, the CPU destination device entry allows for distributed processing of protocols by multiple CPUs in the system. As an example, a first Bridge Protocol Data Unit (BPDU) is sent to a first CPU and a GARP VLAN Registration Protocol (GVRP) PDU is sent to a second CPU. One of ordinary skill in the art would recognize many variations, modifications, and alternatives.

Additionally, the attributes included in an entry in the CPU code table include one or more entries for quality of service (QoS) functions, including the traffic class and drop precedence assigned to a packet. Thus, for a control packet with a given CPU code, the traffic class entry is used to determine the CPU traffic queue to which the packet is sent. If queues become congested, the drop precedence is used to selectively drop packets. The drop precedence entry is used to determine the drop precedence level associated with the packet.

Another attribute is statistical sampling of packets sent to the CPU on a per-CPU code basis. This mechanism can be used to sample to the CPU a statistical percentage of an arbitrary traffic flow that is identified by a policy engine. An additional attribute is packet truncation, which is used for statistical sampling applications that only utilize the packet header information and not the entire packet data. Packet truncation conserves the amount of memory needed for queuing received packets. In a particular example, packets to the CPU are truncated to 128 bytes on a per-CPU code basis.

For systems with a limited number of CPU queues, it is desirable to provide an increased level of control over the delivery of control packets to the CPU. In particular, it is desirable to limit various types of control packets as categorized by their CPU code. Accordingly, embodiments of the present invention provide a CPU code rate limiter as an attribute included in the CPU code table entries. The number of rate limiters provided is a predetermined number. In some embodiments, the number of rate limiters is equal to the number of entries in the CPU code, for example, 256. In other embodiments, the number of rate limiters is less than or greater than the number of CPU code table entries. Moreover, in other embodiments, the CPU code rate limiters are configurable to provide variable functions as described more fully below.

In a specific embodiment, for each CPU code in the CPU code table, a CPU code rate limiter is provided as an attribute that binds the particular CPU code to a rate limiter. The rate limiters provide a system manager with an increased level of control over the rate at which various types of control traffic are sent to the CPU. For a given type of control traffic, represented by a CPU code, the number of control packets sent to the CPU during a predetermined time period (the rate) is limited to a predetermined number. Thus, the rate limiter prevents a single type of control traffic from dominating the CPU, maintains each type of control traffic within its desired rate, and prevents attacks on the CPU, among other benefits.

Figure 2:
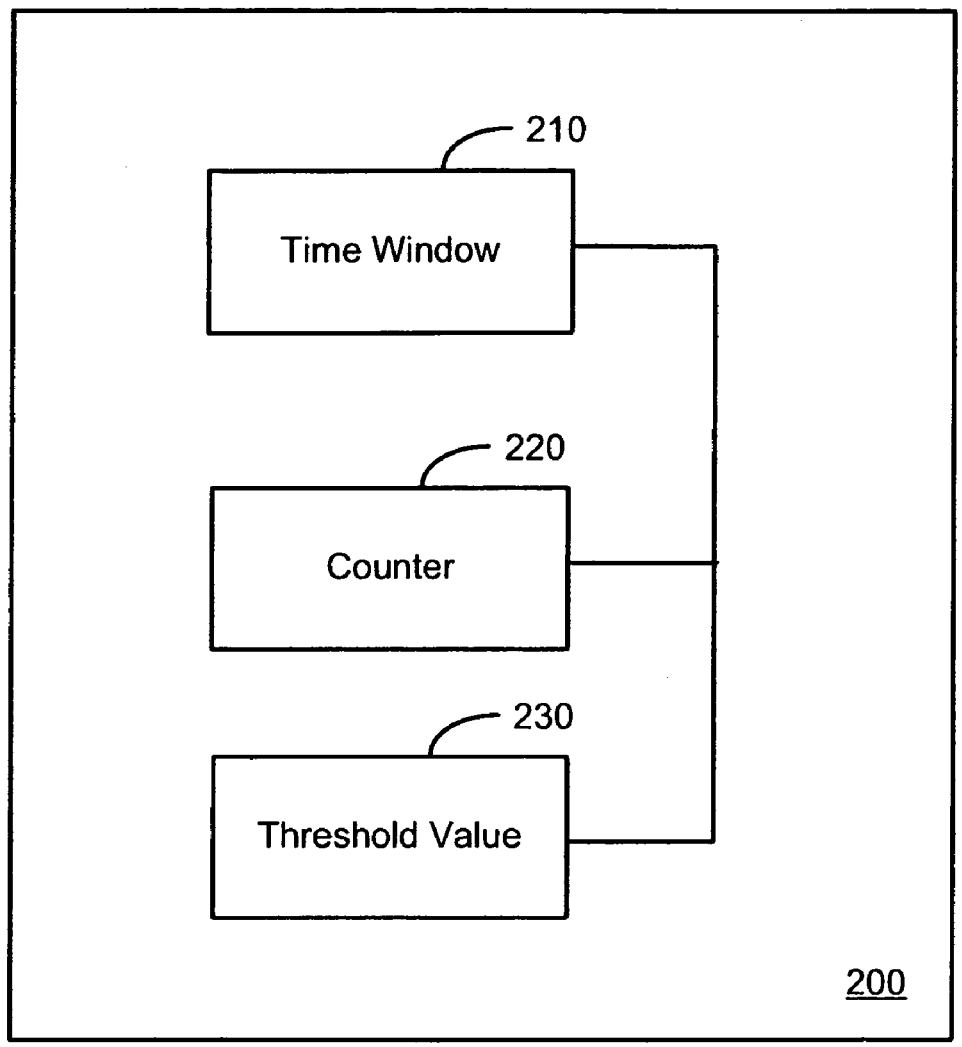
FIG. 2 is a simplified schematic illustration of a CPU code rate limiter according to an embodiment of the present invention.

In the embodiment of the present invention illustrated in FIG. 2, the rate limiter (200) comprises a configurable time window (210), a packet counter (220), and a configurable threshold value (230). Although the following description illustrates an embodiment of a CPU rate limiter provided according to a particular embodiment, the present invention is not limited to this particular embodiment. One of ordinary skill in the art would recognize many variations, modifications, and alternatives.

The time window is a predetermined time period that is configurable by a system user or operator. Depending on the applications and the traffic, the time window varies over a range, from microseconds to one or more seconds. During the time period defined by the time window, it is possible to deliver a predetermined maximum number of packets to the CPU. As described below, once the predetermined maximum number of packets is reached, no additional packets are delivered during the time window. At the expiration of the time window, the counter is reset and packets are once again delivered to the CPU. Thus, the time window comprises a temporal portion of the rate limiter.

The CPU code rate limiter also includes a counter that counts the number of packets that arrive for delivery to the CPU during the predetermined time window. The counter is reset to a baseline value, for example, zero, at the beginning of the time window. For each control packet arriving at the network device that is assigned a given CPU code during the time window, the counter will be incremented. The CPU code rate limiter further includes a configurable threshold value associated with the predetermined maximum number of packets delivered to the CPU during the time window. The value stored in the counter is compared with the threshold value and after the counter reaches the threshold value, no additional packets are delivered to the CPU during the time window.

During a given time window, if the number of packets with a given CPU code that arrive at the network device is not equal to the threshold value, the counter will not reach the threshold value, thereby passing the control packets to the CPU. During periods in which the number of packets with a given CPU code arriving at the device exceeds the threshold value, packets with the given CPU code will be dropped until the time window expires and the counter is reset. When packets are dropped, an interrupt corresponding to the rate-limiter is raised to indicate to the CPU that the given rate limiter has exceeded its threshold. Thus, the rate at which control packets of various types, defined by the CPU code, are sent to the CPU will be rate limited as a function of the time window, the counter, and the threshold value. The system user is provided with significant flexibility since the time window and the threshold value are configurable and may vary as a function of time and traffic level. One of ordinary skill in the art would recognize many variations, modifications, and alternatives.

As an example of an application of embodiments of the present invention, the CPU code rate limiter is useful in preventing a denial of service (DOS) attack on the network and on a CPU in particular. In general, a DOS attacker would like to immobilize the CPU by sending a very high rate of a particular type of control packet. However, utilizing a CPU code rate limiter, the packet processor is adapted to accept a predetermined number of packets during a given time window. When the number of packets during the time window (the arrival rate) exceeds the configurable threshold value, control traffic with the particular CPU code is dropped until the expiration of the time window. Accordingly, embodiments of the present invention protect the CPU from one or more network attacks.

In some embodiments, an interrupt will be raised to the CPU once the threshold value is reached, indicating that for a given CPU code, packets are being dropped, possibly as a result of an attack. As will be evident to one of skill in the art, the CPU can then take some type of response, for example polling the particular type of control traffic to ascertain the identify of the attacker, closing the port, or taking other defensive measures as appropriate to prevent or stop the attack.

Depending on the particular protocol, among other network conditions, the values of the configurable time window and threshold value vary. For some control protocols, the rate of control packets is small, appropriate for long time windows and/or low threshold values. In other applications, for example, traffic sampling or logging, packets are tracked and then dropped. For these applications, the number of control packets is rate limited using the rate limiter to sample a small number of packets. One of ordinary skill in the art would recognize many variations, modifications, and alternatives.

Figure 3:
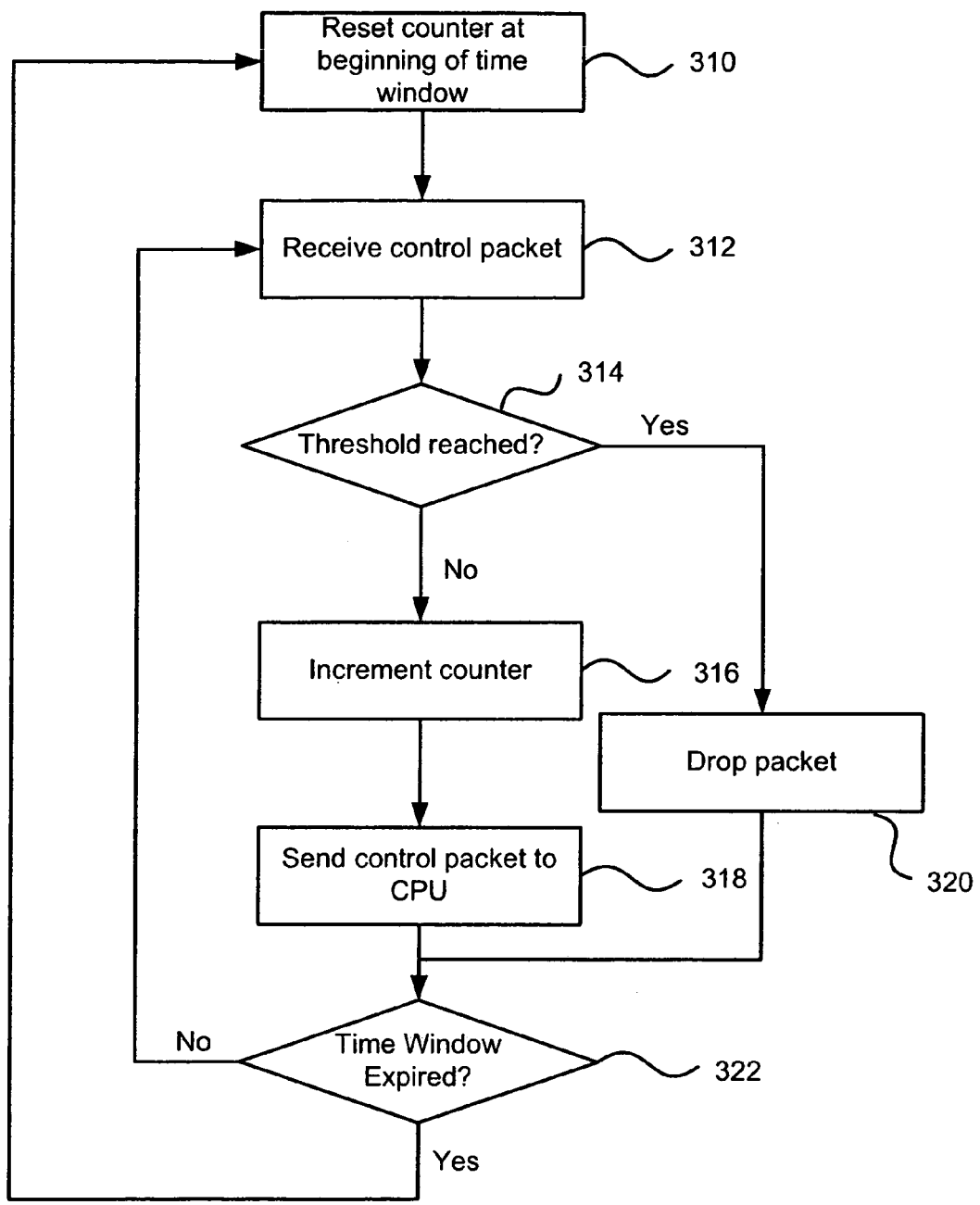
FIG. 3 is a simplified flowchart illustrating a method of utilizing a CPU code rate limiter according to an embodiment of the present invention.

FIG. 3 is a simplified flowchart illustrating a method of utilizing a CPU code rate limiter according to an embodiment of the present invention. Although not illustrated in reference to FIG. 3, the CPU code rate limiter is configured by a system user or operator and includes a predetermined time window and a threshold value. As illustrated in FIG. 3, a counter is reset at the beginning of the time window (310). The time window is a configurable time period set by a system user or operator. According to embodiments of the present invention, the time window is a predetermined time ranging from microseconds to one or more seconds. A control packet is received (312). The control packet has a CPU code associated with the packet and the CPU code is associated with an entry in a CPU code table. As described above, the CPU code table includes an entry for a CPU code rate limiter.

The value stored in the counter is compared with a threshold value (314) to determine if the value stored in the counter is greater than the threshold value. If the counter value is less than the threshold value, the counter is incremented (316) and the packet is delivered to the CPU (318). If the counter value is greater than or equal to the threshold value, the packet is dropped (320). As will be evident to one of skill in the art, no additional packets will be delivered to the CPU during the remainder of the time window.

A determination is made of whether the time window has expired (322). If time window has expired, the counter is reset (310) and the process of rate limiting the control traffic to the CPU continues.

The above description of exemplary embodiments of the invention has been presented for the purposes of illustration and description. It is not intended to be exhaustive or to limit the scope of the invention, which is set forth in the following claims, to the precise form described. Many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A network device for use in a networking system, the network device comprising:
   a packet processor that:
      receives a control packet at a network port of the network device, and
      assigns a first CPU code to the control packet from a plurality of CPU codes, the first CPU code indicative of a type of traffic associated with the control packet and the following:
         a destination for the control packet, the destination corresponds to a CPU to which the control packet is directed so as to enable distributed processing in compliance with protocols at multiple CPUs in the networking system;
         a quality of service (QoS) functionality including a traffic class and a drop precedence associated with the control packet; and
         a statistical sampling parameter based on a packet truncation operation associated with the control packet;
   the CPU being in communication with the packet processor; and
   a memory in communication with the packet processor, the memory being configured to store a lookup table indexed by the plurality of CPU codes, wherein an entry in the lookup table associated with the first CPU code includes a rate limit that defines a rate at which packets associated with the type of traffic are delivered to the CPU,
   wherein the packet processor delivers the control packet to the CPU based on the rate limit associated with the type of traffic.

2. The network device of claim 1 wherein a counter is incremented when the control packet is delivered to the CPU.

3. The network device of claim 2 wherein control packet delivery to the CPU is terminated for a duration of a configurable time window after the counter reaches a configurable threshold value.

4. The network device of claim 1 wherein a counter is periodically reset after a time period equal to a configurable time window.

5. The network device of claim 1 wherein the lookup table is a CPU code table.

6. The network device of claim 1 wherein the packet processor is configured to assign the first CPU code to the control packet based on a control protocol associated with the control packet.

7. The network device of claim 1 wherein the packet processor sends an interrupt signal to the CPU indicative of an attack on the network device when control packets associated with the first CPU code were received at the network port at a rate greater than the rate limit.

8. A method of operating a network device for use in a networking system, the method comprising:
receiving a control packet at a network port of the network device;
assigning a first CPU code to the control packet from a plurality of CPU codes using a packet processor, the first CPU code indicative of a type of traffic associated with the control packet and the following:
a destination for the control packet, the destination corresponds to a CPU to which the control packet is directed so as to enable distributed processing in compliance with protocols at multiple CPUs in the networking system;
a quality of service (QoS) functionality including a traffic class and a drop precedence associated with the control packet; and
a statistical sampling parameter based on a packet truncation operation associated with the control packet;
storing a lookup table indexed by the plurality of CPU codes, wherein an entry in the lookup table associated with the first CPU code includes a rate limit that defines a rate at which packets associated with the type of traffic are delivered to a CPU; and
delivering, by the packet processor, the control packet to the CPU based on the rate limit associated with the type of traffic.

9. The method of claim 8 wherein the rate limit is determined utilizing a configurable time window, a counter, and a configurable threshold value.

10. The method of claim 9 wherein the counter is incremented when the control packet is delivered to the CPU.

11. The method of claim 10 wherein control packet delivery to the CPU is terminated for a duration of the configurable time window after the counter reaches the configurable threshold value.

12. The method of claim 9 wherein the counter is periodically reset after a time period equal to the configurable time window.

13. The method of claim 8 wherein the lookup table is a CPU code table.

14. The method of claim 8 further comprising assigning the first CPU code to the control packet based on a control protocol associated with the control packet.

15. A method of managing control packets in a communications network, the method comprising:
receiving a control packet at a network device including a CPU;
providing a CPU code table indexed by a plurality of CPU codes, the plurality of CPU codes respectively associated with a plurality of entries of the CPU code table, wherein an entry of the CPU code table comprises a rate limiting attribute defining a rate at which control packets associated with respective types of traffic are delivered to the CPU; and
assigning a CPU code from the plurality of CPU codes to the control packet, the CPU code indicative of a type of traffic associated with the control packet and the following:
a destination for the control packet, the destination corresponds to a CPU to which the control packet is directed so as to enable distributed processing in compliance with protocols at multiple CPUs in the networking system;
a quality of service (QoS) functionality including a traffic class and a drop precedence associated with the control packet; and
a statistical sampling parameter based on a packet truncation operation associated with the control packet; and
routing the control packet to the CPU in accordance with the rate limiting attribute associated with the type of traffic.

16. The method of claim 15 wherein the rate limiting attribute comprises a CPU code rate limiter.

17. The method of claim 16 wherein the CPU code rate limiter comprises a predetermined time value, a counter, and a predetermined threshold value.

18. The method of claim 17 wherein the counter is incremented in response to the routing of the control packet to the CPU.

19. The method of claim 17 wherein routing of the control packet to the CPU is ceased when a number of packets routed to the CPU during the predetermined time value equals the predetermined threshold value.

20. The method of claim 17 wherein the counter is periodically reset after a time period equal to the predetermined time value.

21. The method of claim 15 further comprising assigning the CPU code to the control packet based on a control protocol associated with the control packet.

22. A network device configured to manage control packets in a communications network, the network device comprising:
an ingress pipeline configured to receive a control packet at the network device, wherein the network device includes a CPU;
a memory configured to store a CPU code table indexed by a plurality of CPU codes, the plurality of CPU codes respectively associated with a plurality of entries of the CPU code table, each entry of the CPU code table comprising a rate limiting attribute defining a rate at which control packets associated with respective types of traffic are delivered to the CPU; and
a packet processor configured to assign a CPU code from the plurality of CPU codes to the control packet, the CPU code indicative of a type of traffic associated with the control packet and the following:
a destination for the control packet, the destination corresponds to a CPU to which the control packet is directed so as to enable distributed processing in compliance with protocols at multiple CPUs in the networking system;
a quality of service (QoS) functionality including a traffic class and a drop precedence associated with the control packet; and
a statistical sampling parameter based on a packet truncation operation associated with the control packet,
wherein the packet processor routes the control packet to the CPU in accordance with the rate limiting attribute associated with the type of traffic.

23. The network device of claim 22 wherein the rate limiting attribute comprises a CPU code rate limiter.

24. The network device of claim 23 wherein the CPU code rate limiter comprises a predetermined time value, a counter, and a predetermined threshold value.

25. The network device of claim 24 wherein the counter is incremented in response to the routing of the control packet to the CPU.

26. The network device of claim 24 wherein the packet processor is configured to cease routing of the control packet to the CPU when a number of packets routed to the CPU during the predetermined time value equals the predetermined threshold value.

27. The network device of claim 24 wherein the counter is periodically reset after a time period equal to the predetermined time value.

28. A method of rate limiting packet delivery to a CPU in a network device, the method comprising:
   receiving a control packet at a port of the network device;
   assigning a CPU code to the control packet, the CPU code is indicative of a type of traffic associated with the control packet and the following:
      a destination for the control packet, the destination corresponds to a CPU to which the control packet is directed so as to enable distributed processing in compliance with protocols at multiple CPUs in the networking system;
      a quality of service (QoS) functionality including a traffic class and a drop precedence associated with the control packet; and
      a statistical sampling parameter based on a packet truncation operation associated with the control packet;
   comparing a value stored in a counter associated with the CPU code to a threshold value stored in a memory where the counter is configured to count a number of control packets associated with the type of traffic processed by the network device during a predetermined time;
   delivering the control packet to the CPU and incrementing the value stored in the counter when the value stored in the counter is less than the threshold value;
   dropping the control packet when the value stored in the counter is greater than or equal to the threshold value; and
   resetting the value stored in the counter to a baseline value after the predetermined time has passed.

29. The method of claim 28 wherein the CPU code indexes a CPU code table.

30. The method of claim 28 wherein the threshold value stored in the memory comprises a value stored in a CPU code rate limiter.

31. The method of claim 30 wherein the CPU code rate limiter is included in a CPU code table.

32. The method of claim 30 wherein the predetermined time comprises a time window associated with the CPU code rate limiter.

33. The method of claim 28 further comprising assigning the CPU code to the control packet based on a control protocol associated with the control packet.

34. An apparatus that rate limits packet delivery to a CPU in a network device, the apparatus comprising:
   a port of the network device that receives a control packet; and
   a processor configured to:
      assign a CPU code to the control packet, the CPU code is indicative of a type of traffic associated with the control packet and the following:
         a destination for the control packet, the indicated destination corresponds to a CPU to which the control packet is directed so as to enable distributed processing in compliance with protocols at multiple CPUs in the networking system;
         a quality of service (QoS) functionality including a traffic class and a drop precedence associated with the control packet; and
         a statistical sampling parameter based on a packet truncation operation associated with the control packet;
      compare a value stored in a counter associated with the CPU code to a threshold value stored in a memory where the counter is configured to count a number of control packets associated with the type of traffic processed by the network device during a predetermined time;
      deliver the control packet to the CPU and increment the value stored in the counter when the value stored in the counter is less than the threshold value;
      drop the control packet when the value stored in the counter is greater than or equal to the threshold value; and
      reset the value stored in the counter to a baseline value after the predetermined time has passed.

35. The apparatus of claim 34 wherein the CPU code indexes a CPU code table.

36. The apparatus of claim 34 wherein the threshold value stored in the memory comprises a value stored in a CPU code rate limiter.

37. The apparatus of claim 36 wherein the CPU code rate limiter is included in a CPU code table.

38. The apparatus of claim 36 wherein the predetermined time comprises a time window associated with the CPU code rate limiter.

39. The apparatus of claim 34 wherein the processor is configured to assign the CPU code to the control packet based on a control protocol associated with the control packet.

* * * * *